(12) United States Patent
Taniuchi et al.

(10) Patent No.: US 7,294,375 B2
(45) Date of Patent: Nov. 13, 2007

(54) CEMENT COMPOSITE, CONCRETE, CONCRETE CASK AND METHOD OF MANUFACTURING CONCRETE

(75) Inventors: Hiroaki Taniuchi, Takasago (JP); Jun Shimojo, Takasago (JP); Yutaka Sugihara, Ichikawa (JP); Eiji Owaki, Yokohama (JP); Reiko Okamoto, Kawasaki (JP)

(73) Assignees: Kabushiki Kaisha Kobe Seiko Sho, Kobe-shi (JP); Taisei Corporation, Tokyo (JP)

( * ) Notice: Subject to any disclaimer, the term of this patent is extended or adjusted under 35 U.S.C. 154(b) by 392 days.

(21) Appl. No.: 10/621,652

(22) Filed: Jul. 18, 2003

(65) Prior Publication Data

US 2004/0067328 A1   Apr. 8, 2004

(30) Foreign Application Priority Data

Jul. 18, 2002  (JP)  ............................. 2002-209842
Jan. 31, 2003  (JP)  ............................. 2003-024209

(51) Int. Cl.
*B28B 11/00* (2006.01)
*B28B 21/00* (2006.01)
*B28B 21/72* (2006.01)
*B28B 23/08* (2006.01)

(52) U.S. Cl. ............................. 428/34.4; 588/3; 588/4; 588/16

(58) Field of Classification Search ............... 428/34.4; 588/3, 4, 16
See application file for complete search history.

(56) References Cited

U.S. PATENT DOCUMENTS 2,726,339 A  * 12/1955  Borst  ...................... 250/518.1

(Continued)

FOREIGN PATENT DOCUMENTS

DE  40 23 226  1/1992

(Continued)

OTHER PUBLICATIONS

F.N. Rabinovich, et al., "Use of Composition Materials Based on Dispersely Reinforced Concrete in Containers and Storehouses for Radioactive Waste", Atomic Energy, vol. 82, No. 2, 1997, pp. 8-91.

(Continued)

*Primary Examiner*—Michael Miggins
(74) *Attorney, Agent, or Firm*—Oblon, Spivak, McClelland, Maier & Neustadt, P.C.

(57) ABSTRACT

The invention provides a composite from which concrete featuring a sufficiently high heat resistance can be produced, as well as a high-safety sealed concrete cask having no opening (shielding defect) to offer high shielding performance that can prevent corrosion of an internal canister and release of radioactive material to the exterior. A concrete cask of the invention includes a cask body having a bottom but no lid in itself, and a lid which can open and close off a top opening of the cask body. Both the cask body and the lid are made of concrete manufactured by using a composite including Portland cement or blended cement containing Portland cement, which is mixed with water in such a manner that the content of calcium hydroxide falls in a range of 15% to 60% by mass after hardening through hydration reaction. Metallic heat-transfer fins are embedded in the cask body.

9 Claims, 11 Drawing Sheets

U.S. PATENT DOCUMENTS

| | | | | |
|---|---|---|---|---|
| 3,002,843 | A | * 10/1961 | Stocker | .................. 106/679 |
| 3,780,306 | A | 12/1973 | Anderson et al. | |
| 3,888,795 | A | 6/1975 | Kasberg | |
| 3,947,284 | A | 3/1976 | Kitsugi et al. | |
| 4,197,218 | A | * 4/1980 | McKaveney | ............... 252/503 |
| 5,457,263 | A | 10/1995 | Berglund | |
| 5,740,546 | A | 4/1998 | Hooper | |
| 5,819,186 | A | 10/1998 | Stephens | |

FOREIGN PATENT DOCUMENTS

| | | |
|---|---|---|
| DE | 43 25 829 | 3/1995 |
| DE | 29616052 U1 * | 2/1997 |
| EP | 0 464 203 | 1/1992 |
| JP | 52150434 A * | 12/1977 |
| JP | 56005371 A * | 1/1981 |
| JP | 59-64551 | 4/1984 |
| JP | 3166097 | 12/1995 |
| JP | 10-330138 | 12/1998 |
| JP | 11-209151 | 8/1999 |
| JP | 11-263659 | 9/1999 |
| JP | 3164131 | 5/2001 |
| SU | 776999 B * | 11/1980 |

OTHER PUBLICATIONS

D.M. Akhmad'yarov, "New-Generation Concretes for Nuclear Power and Industry in Russia", Atomic Energy, vol. 78, No. 2, Feb. 1995, pp. 124-128.

* cited by examiner

FIG. 6

BORON CONTENT VS. RELATIVE DOSE EQUIVALENT RATE

| BORON CONTENT | PRIMARY GAMMA RAYS | NEUTRONS | SECONDARY GAMMA RAYS | TOTAL |
|---|---|---|---|---|
| 0 | 0.33 | 0.27 | 0.40 | 1.00 |
| 0.025 | 0.33 | 0.24 | 0.20 | 0.77 |
| 0.05 | 0.33 | 0.24 | 0.14 | 0.71 |
| 0.1 | 0.33 | 0.23 | 0.10 | 0.67 |
| 0.2 | 0.33 | 0.23 | 0.08 | 0.64 |
| 0.4 | 0.33 | 0.23 | 0.06 | 0.62 |
| 0.8 | 0.34 | 0.23 | 0.05 | 0.62 |
| 1 | 0.34 | 0.23 | 0.05 | 0.62 |
| 2 | 0.35 | 0.23 | 0.04 | 0.62 |
| 3 | 0.36 | 0.24 | 0.04 | 0.64 |
| 5 | 0.39 | 0.26 | 0.04 | 0.68 |
| 10 | 0.44 | 0.29 | 0.04 | 0.77 |

CEMENT COMPOSITE, CONCRETE, CONCRETE CASK AND METHOD OF MANUFACTURING CONCRETE

BACKGROUND OF THE INVENTION

1. Field of the Invention

The present invention relates to a concrete cask suitable for transportation and long-term storage of radioactive materials, such as spent nuclear fuel. More particularly, the invention is concerned with technology for increasing the performance of the concrete cask through improvements of its cement composite and construction.

2. Description of the Related Art

Conventional technologies concerning concrete casks are disclosed in Japanese Unexamined Patent Publication Nos. 2001-141891 and 2001-305375, for example.

Patent Publication No. 2001-305375 describes an construction of a concrete cask, in which surfaces of the concrete cask are covered by steel plates to prevent its cracking and loss of water content and to achieve enhanced durability, and partitions are provided in the cask to prevent concrete cracking.

Patent Publication No. 2001-141891 describes a concrete cask manufactured by using an ordinary low heat-resistance concrete blend. According to the Publication, there is formed a gap between the concrete cask and a canister taking into consideration temperature limitations of concrete. The concrete cask has air inlets and air outlets. External air introduced through the air inlets is caused to convent inside the cask to directly cool the canister and avoid temperature increase of the concrete. To further decrease the temperature of the concrete, the concrete cask is provided with liners and internal fins.

While the technology of Publication No. 2001-305375 helps prevent concrete cracking, the concrete cask has poor heat resistance. It is therefore necessary to continuously introduce external air into the cask. An opening for introducing the external air acts as a "shielding defect" which could increase streaming of radioactive rays. The external air is likely to contain corrosive substances, such as chlorides, which would accelerate corrosion of a steel-made canister. Therefore, the concrete cask of this prior art technology tends to pose problems related to sealing performance.

Since the concrete cask of Publication No. 2001-141891 is made of concrete having low heat resistance, it is necessary to introduce air to the interior of the cask. This would require a complicated structure of the concrete cask and pose a risk of releasing radioactive gases in case of canister breakage.

The conventional concrete casks is made of concrete of which heat-resisting temperature is 90° C. or less, so that they generally necessitate complicated structures such as the provision of through holes for ventilation. If such through holes are made in the concrete cask, the external air goes into direct contact with the canister provided inside the cask, resulting in corrosion of the canister and accidental release of radioactive material into the environment from inside the canister. Conventional concrete retains hydrogen, which is effective for shielding neutrons, in the form of free water which evaporates at temperatures of 100° C. or above. Thus, the conventional concrete casks have a problem that their neutron-shielding performance considerably decreases when used under high-temperature conditions (100° C. or above).

SUMMARY OF THE INVENTION

Under such circumstances, it is an object of the invention to provide a composite from which concrete featuring a sufficiently high heat resistance can be produced. It is another object of the invention to design and manufacture a high-safety sealed concrete cask using the composite that can prevent corrosion of an internal canister and release of radioactive material to the exterior and offer high shielding performance without the provision of any opening (shielding defect) in the cask. It is a further object of the invention to provide a concrete cask of which concrete structure can retain a water content that is effective for shielding neutrons even at a temperature of 100° C. or above. (In this invention, a practical operating temperature of the concrete cask is assumed to be 150° C.)

According to the invention, a composite includes Portland cement or blended cement containing Portland cement, and at least one metallic material selected from the group consisting of iron, carbon steel and stainless steel in particulate, powder or fiber form, wherein the content of calcium hydroxide falls in a range of 15% to 60% by mass after hardening through hydration reaction, and the content of the metallic material falls in a range of 10% to 70% by mass after hardening through hydration reaction.

These and other objects, features and advantages of the invention will become more apparent upon reading the following detailed description along with the accompanying drawings.

BRIEF DESCRIPTION OF THE DRAWINGS

FIG. 6 is a table showing the amount of boron expressed in terms of its ratio to the total amount of materials and the relative dose equivalent rate;

DETAILED DESCRIPTION OF THE PREFERRED EMBODIMENTS OF THE INVENTION

Figure 1:
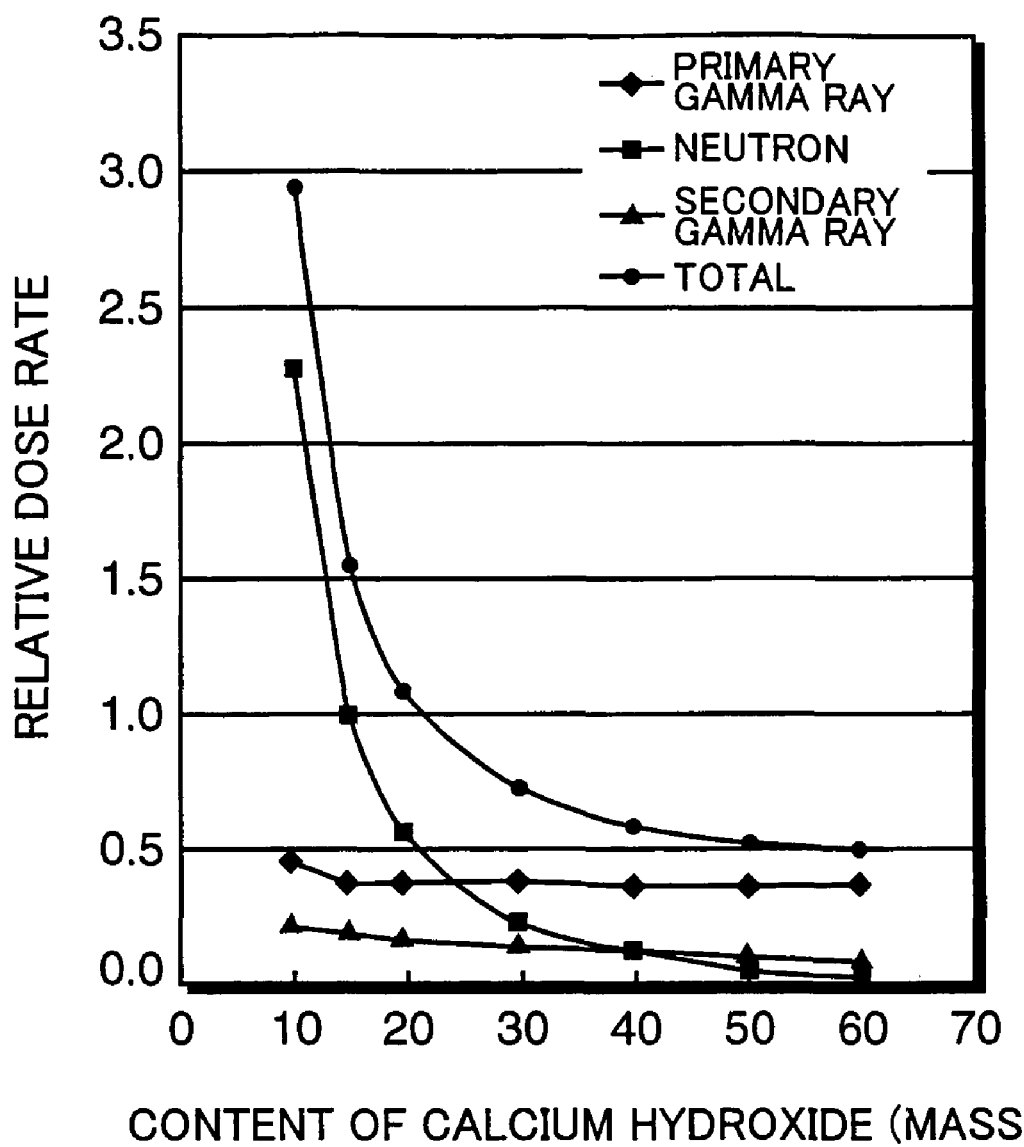
FIG. 1 is a graph showing the relationship between the content of calcium hydroxide and the relative dose rate.

The invention is now described with reference to specific embodiments thereof. The following discussion first deals with cement composites-and concretes.

A cement composite of the invention is a composite containing Portland cement or a composite containing blended cement containing Portland cement, in which raw materials are blended in such a manner that the content of calcium hydroxide is 15% to 60% by mass, preferably 20% to 50% by mass, after hardening through hydration reaction.

Also, a cement composite of the invention is a composite containing Portland cement which is blended in such a manner that the composite contains after hardening through hydration reaction at least 15% by mass of hydroxide material which retains water in the form of a crystalline structure of which melting temperature and decomposition temperature (the temperature at which dissociation pressure becomes 1 atmosphere) exceed 100° C. More preferably, the composite is blended in such a manner that the content of the hydroxide material is 20% by mass or higher after hardening. Still more preferably, the composite is blended in such a manner that the content of the hydroxide material is 80% by mass or lower after hardening.

Typical hydroxide materials of which melting and decomposition temperatures are higher than 100° C. are hydroxides of alkaline earth metals, such as calcium (Ca), strontium (Sr), barium (Ba) and radium (Ra), as well as magnesium (Mg) which is a member of a homologous series of the alkaline earth metals. These hydroxides are mixed in concrete and retain water (hydrogen) in the form of water of crystallization, which provides excellent neutron-shielding performance. For example, the decomposition temperature of calcium hydroxide is 580° C. and the melting and decomposition temperatures of barium hydroxide is 325° C. and 998° C., respectively, so that they retain water (hydrogen) up to high temperature ranges. Other hydroxides often blended in a cement composite or concrete include lithium hydroxide, sodium hydroxide, potassium hydroxide, lanthanum hydroxide, chromium hydroxide, manganese hydroxide, iron hydroxide, cobalt hydroxide, nickel hydroxide, copper hydroxide, zinc hydroxide, aluminum hydroxide, lead hydroxide, gold hydroxide, platinum hydroxide and ammonium hydroxide.

Hydroxides least soluble or insoluble in water are preferable for producing a cement composite. By the addition of such hydroxides, it is possible to ensure that concrete obtained through hydration reaction contains hydroxides which do not decompose and release water at 100° C. or above.

The solubility of a hydroxide to be blended in a cement composite in pure water should be such that the soluble amount of the hydroxide is preferably 15 g or less, more preferably 5 g or less, and most preferably 1 g or less, per 100 g of pure water at 20° C. The aforementioned hydroxides of alkaline earth metals and magnesium which is a member of the homologous series are most excellent compounds from the viewpoint of solubility. For example, the solubilities of the hydroxides of calcium, strontium and magnesium are 1 g or less per 100 g of pure water, and the solubility of the hydroxide of barium is 5 g or less per 100 g of pure water.

Among these hydroxides, the hydroxides of calcium and magnesium are particularly effective for improving the neutron-shielding performance. This is because the atomic weights of calcium and magnesium are so small that their hydroxides have high hydrogen contents.

Since calcium contained in calcium hydroxide is a main component of Portland cement and calcium hydroxide is a material produced by the ordinary reaction of hydration, calcium hydroxide is most preferable among the aforementioned hydroxides.

Concretes of the invention are produced by using the aforementioned cement composites, in which the percentage contents of the hydroxides, such as calcium hydroxide, are based on the results of experiments which will be discussed below.

In order to ensure that hydroxides, such as calcium hydroxide, are present in concrete obtained after hardening through hydration reaction, the hydroxides like calcium hydroxide may be directly added to a composite (which may be Portland cement or blended cement containing Portland cement) as shown in the following discussion of the experiments. Alternatively, a material other than calcium hydroxide may be added to the composite (which may be Portland cement or blended cement containing Portland cement) so that concrete obtained after hardening through hydration reaction contains the hydroxides like calcium hydroxide at the aforementioned percentage contents. An example of such alternative material is calcium oxide (quick lime).

Experiment 1

Assuming composites and concretes produced by blending appropriate quantities of Portland cement, silica fume, metallic material, chemical admixture and water and adding calcium hydroxide at various ratios, relative dose rates of the concrete cask were calculated on a simulation basis in Experiment 1. Here, the relative dose rate is defined as the ratio of dose equivalent rate at a central part of a concrete cask produced by using ordinary concrete to dose equivalent rate at a central part of a concrete cask produced by using the concrete of the invention.

FIG. 1 shows the relationship between the content of calcium hydroxide and the relative dose rate. In carrying out the simulation, an assumption was made that an iron shield was 20 cm thick, a concrete shield was 35 cm thick, the type of fuel was pressurized water reactor (PWR) fuel, burnup was 50,000 MWD/MTU, and cooling time was 10 years.

It can be seen from FIG. 1 that as the content of calcium hydroxide reaches 15% by mass, the relative dose rate with respect to neutrons becomes equal to about 1, whereby the concrete of the invention exerts neutron-shielding performance approximately equivalent to that of the ordinary (conventional) concrete. As the content of calcium hydroxide exceeds 15% by mass, the relative dose rate becomes smaller than 1, whereby the concrete of the invention exerts higher neutron-shielding performance than the ordinary concrete. Thus, the content of calcium hydroxide in concrete should preferably be 15% by mass or higher. As the content of calcium hydroxide reaches about 60% by mass, the curve of the relative dose rate becomes almost flat indicating that a further improvement in the neutron-shielding performance is scarcely obtained. From this observation, it is recognized that the content of calcium hydroxide in concrete should preferably be 15% to 60% by mass. A minimum density of about 1.8 $g/cm^3$ is needed to obtain neutron and gamma-shielding performance comparable to ordinary concrete material. Thus, it can be said that the maximum amount of calcium hydroxide to be added is preferably 80% by mass to obtain the minimum density of 1.8 $g/cm^3$.

While FIG. 1 indicates that the neutron-shielding performance improves with an increase in the content of calcium hydroxide, the relative dose rate with respect to neutrons becomes equal to about 0.5 or less at a calcium hydroxide content of 20% by mass or higher. Thus, the concrete cask of the invention exhibits high neutron-shielding performance at the calcium hydroxide content of 20% by mass or higher compared to the conventional concrete cask. When the content of calcium hydroxide exceeds 50% by mass, the curve of the relative dose rate becomes almost flat. This indicates that no significant improvement in the neutron-shielding performance is achieved any more even if further quantities of calcium hydroxide are added. Therefore, from the viewpoint of cost-effectiveness, i.e., the balance between manufacturing cost and adequate shielding performance, the content of calcium hydroxide in the concrete should preferably be 20% to 50% by mass.

As shown in the foregoing discussion, the content of hydroxides, such as calcium hydroxide, should preferably be 15% to 60% by mass or 15% to 80% by mass, more preferably be 20% to 50% by mass. The composite and concrete of the invention make it possible to manufacture a concrete structure featuring excellent neutron-shielding performance. This characteristic serves to reduce the thickness of a shielding structure compared to prior art structures, permitting an eventual reduction in the size and weight of the concrete cask.

Although the aforementioned calculation results of Experiment 1 were obtained on the assumption that the concrete structure of the invention was used at 150° C., calcium hydroxide contained in the concrete does not begin to decompose until its temperature reaches approximately 450° C. Thus, the concrete structure of the invention exhibits the same neutron-shielding performance even under high-temperature conditions exceeding 150° C. Calculation results for the ordinary concrete, which was used as a comparative example, were obtained on the assumption that the ordinary concrete was used at room temperature. Since free water evaporates at 100° C. and above, the neutron-shielding performance of the ordinary concrete remarkably deteriorates under high-temperature conditions. The concrete of the invention is therefore significantly superior to the ordinary concrete with respect to the neutron-shielding performance under high-temperature conditions. As previously mentioned, the practical operating temperature of the concrete cask is assumed to be 150° C. in this invention.

It is desirable that the composite of the invention be blended with at least one of metallic materials which include iron, carbon steel, stainless steel, copper, copper alloy, tungsten, tungsten alloy and tungsten compound shaped into particulate, powder or fiber form. It is possible to produce high-density concrete by blending one or more of these metallic materials. Inclusion of at least one of such metallic materials as iron, carbon steel and stainless steel makes it particularly easy to achieve a high density. Compared to such iron-based metallic materials, inclusion of such materials as copper, copper alloy, tungsten, tungsten alloy and tungsten compound makes it possible to achieve a yet higher density. The concrete blended with any of such nonferrous metallic materials can contain larger amounts of hydroxides if the concrete is regulated in such a manner that its density equals the density of the concrete blended with any of the aforementioned ferrous metallic materials. Furthermore, copper and copper alloy have higher thermal conductivities than iron and tungsten, so that inclusion of copper or copper alloy serves to increase the thermal conductivity of the concrete.

When at least one of metallic materials to be blended is selected from iron, carbon steel and stainless steel, or when at least one of metallic materials to be blended is selected from copper and copper alloy, it is preferable that the metallic material selected be blended such that its content becomes 10% to 70% by mass after hardening through hydration reaction.

When at least one of metallic materials to be blended is selected from tungsten, tungsten alloy and tungsten compound it is preferable that the metallic material selected be blended such that its content becomes 10% to 85% by mass after hardening through hydration reaction. Generally, the higher the density of a material, the better the gamma-ray shielding performance of the material. On the other hand, workability of a composite depends on the volumetric mixing ratio of metallic material. It is understood from the foregoing that if tungsten having a higher density (specific gravity=1) than iron is blended at the same volumetric mixing ratio as iron, it is possible to manufacture higher density concrete with little influence on workability.

Figure 4:
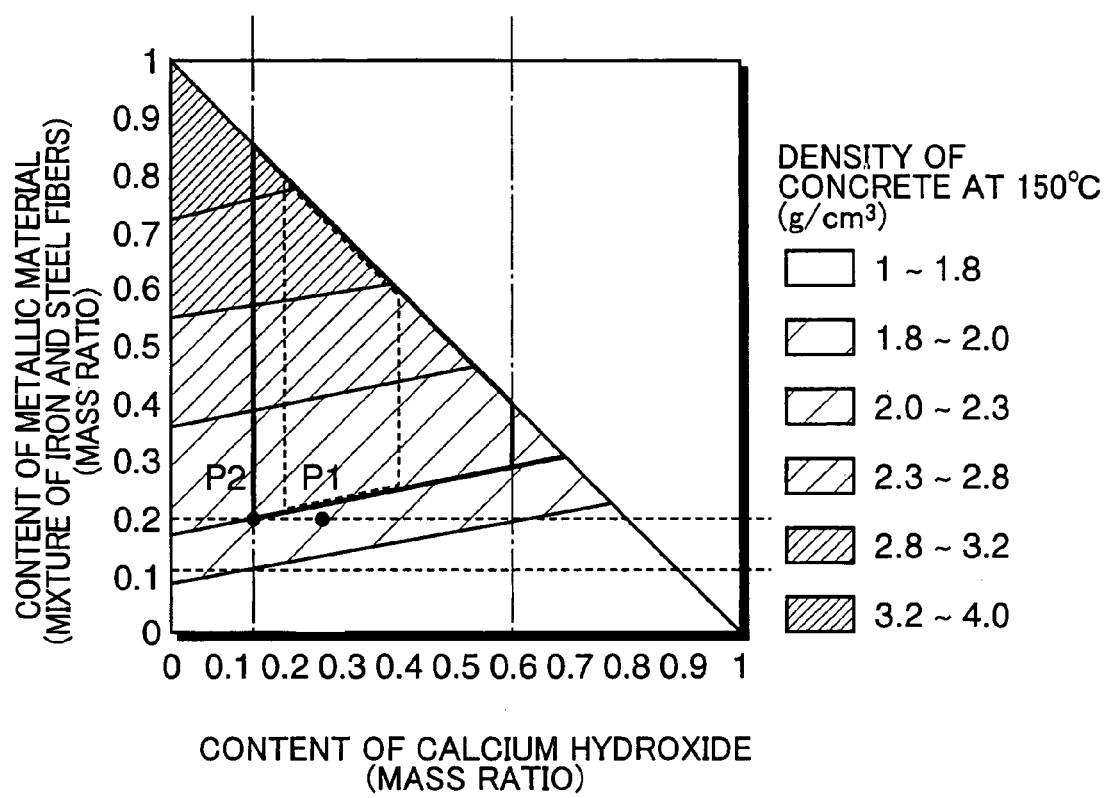
FIG. 4 is a graph showing the relationship between the density of concrete at 150° C. and the content of calcium hydroxide and metallic material.

In order to increase the content of hydroxides, such as calcium hydroxide, in the concrete as much as possible while maintaining approximately the same density, i.e., 2.0 g/cm$^3$ or above, as that of the ordinary concrete, the lower limit of the proportion of the metallic material to be added should preferably be 30% by mass (refer to FIG. 4). To meet this requirement, the metallic material is mixed in such a manner that its percentage content becomes 30% to 70% by mass after hardening through hydration reaction. This knowledge about the amounts of metallic materials to be added has been obtained from three kinds of experiments (Experiments 2 to 4) which will be described in the following.

Experiment 2

Assuming composites and concretes produced by blending appropriate quantities of Portland cement, silica fume, calcium hydroxide, chemical admixture and water and adding iron (metallic material) at various ratios, relative dose rates of the concrete cask were calculated on a simulation basis in Experiment 2.

Figure 2:
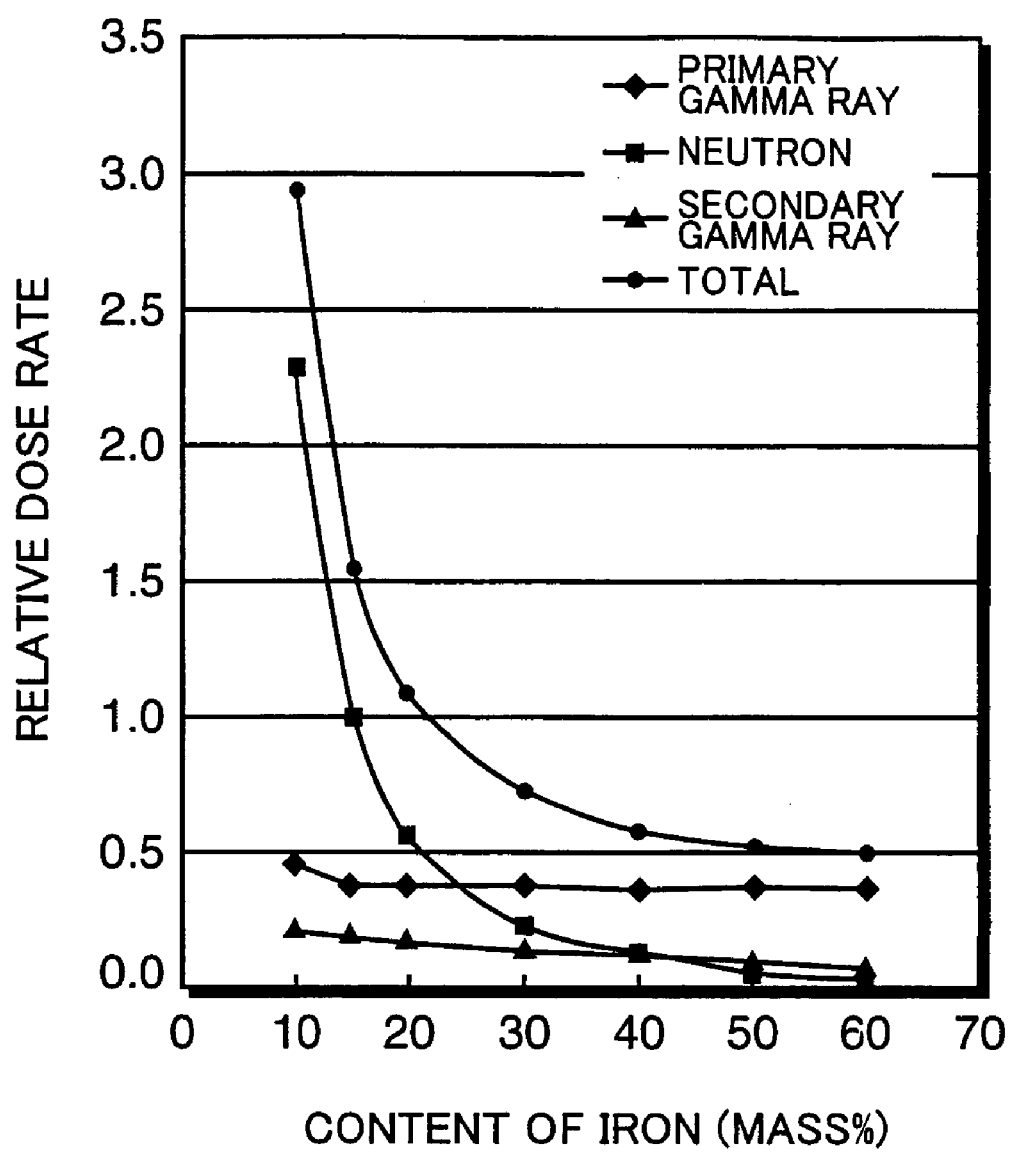
FIG. 2 is a graph showing the relationship between the content of iron and the relative dose rate.

FIG. 2 shows the relationship between the content of iron and the relative dose rate. In carrying out the simulation, an assumption was made that an iron shield was 17 cm thick, a concrete shield was 41 cm thick, the type of fuel was PWR fuel, burnup was 50,000 MWD/MTU, and cooling time was 10 years.

It can be seen from FIG. 2 that as the content of iron (metallic material) reaches 10% by mass, the relative dose rate with respect to primary gamma rays becomes lower than 0.6, whereby the concrete of the invention exerts primary gamma ray shielding performance approximately equivalent to or better than that of the ordinary concrete. It can also be seen that the shielding performance of the concrete of the invention is by far superior to the ordinary concrete in a region where the content of iron is 15% by mass or higher.

Experiment 3

In this Experiment, composites and concretes were produced by mixing calcium hydroxide and metallic materials (a mixture of iron powder and steel fibers) with Portland cement at various mixing ratios, and the relationship between the proportions of calcium hydroxide and metallic materials in the concrete and its water content at an operating temperature of 150° C. was determined.

Figure 3:
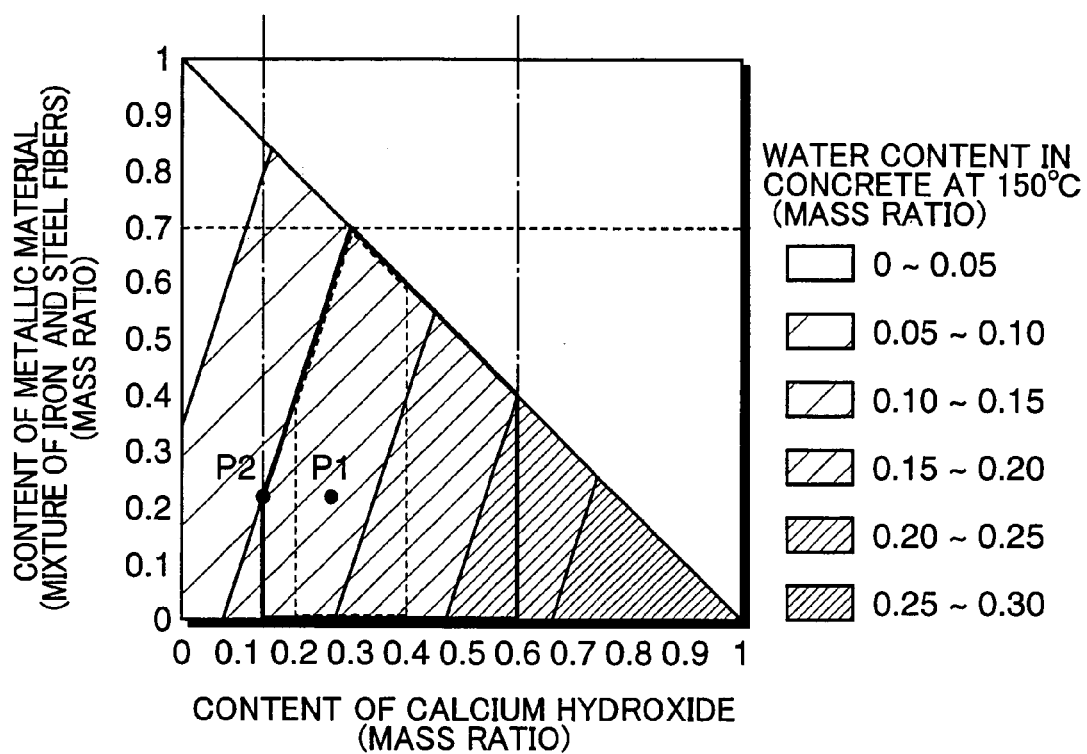
FIG. 3 is a graph showing the relationship between water content at 150° C. and the content of calcium hydroxide and metallic material.

FIG. 3 shows results of this analysis, in which the horizontal axis represents the content of calcium hydroxide and the vertical axis represents the content of the metallic material in terms of mass ratio. If the content of a particular materials is zero, the relevant material is not contained at all. If the content of a particular material is 1, it means that the relevant material has substituted the entirety of cement. Therefore, the sum of the content of calcium hydroxide and the content of the metallic materials does not exceed the value 1 in any case. The water content is expressed by different shades of hatching, where the smaller the distance between parallel lines of hatching, the higher the water content.

It can be seen from FIG. 3 that the water content increases as the content of calcium hydroxide is increased, and the water content gradually decreases as the content of the metallic materials is increased.

Point P1 in FIG. 3 shows one example of a composite of which composition is given in Table 1. It is to be noted that numerical values of Table 1 representing the contents of individual constituents were corrected by the measured amount of air. It is known that concrete manufactured according to the composition of Table 1 exhibits shielding performance approximately equivalent to that of the ordinary concrete at least against primary gamma rays.

TABLE 1

| | | | Quantity per unit volume (kg/m³) | | | | |
|---|---|---|---|---|---|---|---|
| | | | | Metallic materials | Chemical admixture | | |
| Low-heat Portland cement | Silica fume | Calcium hydroxide | Iron powder | Steel fibers | High-range water-reducing and air-entraining admixture | Antifoamer | Water |
| 743 | 83 | 551 | 268 | 152 | 83 | 0 | 248 |

As already mentioned with reference to Experiment 1 (FIG. 1), the content of calcium hydroxide in concrete should preferably be 15% by mass (0.15 in mass ratio) or higher in order for the concrete to exhibit shielding performance comparable to the ordinary concrete.

Point P2 in FIG. 3 shows another example of composition in which the content of calcium hydroxide is set to the aforementioned minimum level of 0.15 in mass ratio to reduce cost while maintaining the content of the metallic materials shown above to ensure the necessary shielding performance against primary gamma rays.

It is noted from FIG. 3 that the water content in concrete at 150° C. of which composition is shown by point P2 is just 0.1. This indicates that the shielding performance equivalent to that of the ordinary concrete is obtained if the water content at 150° C. is made equal to 0.1 or higher in mass ratio.

Enclosed by thick solid lines in FIG. 3 is a region in which the water content at 150° C. is 0.1 or higher and the content of calcium hydroxide is 0.15 or higher but not higher than 0.6. Also, enclosed by broken lines in FIG. 3 is a region in which the content of calcium hydroxide is 0.2 or higher but not higher than 0.4.

It is seen that the content of the metallic materials is 0.7 or lower in mass ratio at any point in these two regions. This indicates that the content of the metallic materials should preferably be 0.7 or lower in mass ratio whether the content of calcium hydroxide is within a range of 15% to 60% by mass or a range of 20% to 40% by mass.

Experiment 4

Subsequently, Experiment 4 was conducted to determine the relationship between the proportions of calcium hydroxide and metallic materials in the aforementioned concrete and its density at 150° C. FIG. 4 shows results of this analysis, in which the density of the concrete is expressed by different shades of hatching, where the smaller the distance between parallel lines of hatching, the higher the density.

FIG. 4 also shows point P1 corresponding to the composition of Table 1 as well as point P2 corresponding to the composition in which the content of calcium hydroxide is set to the minimum level based on the composition of Table 1.

It can be seen from FIG. 4 that, because the density of the concrete of the composition shown by point P2 is 2.0 g/cm³ at 150° C., it is necessary that the density at 150° C. should approximately be 2.0 g/cm³ to achieve shielding performance at least equivalent to that of the ordinary concrete.

Enclosed by thick solid lines in FIG. 4 is a region satisfying these conditions, in which the content of calcium hydroxide is 0.15 or higher but not higher than 0.6. Also, enclosed by thick broken lines in FIG. 4 is a region in which the content of calcium hydroxide is 0.2 or higher but not higher than 0.4.

Taking this into consideration, it is understood that the content of the metallic materials should be 0.2 or higher in mass ratio when the content of calcium hydroxide is within a range of 15% to 60% by mass and that the content of the metallic materials should also be about 0.2 or higher in mass ratio when the content of calcium hydroxide is within a range of 20% to 40% by mass. It should however be appreciated that the content of the metallic materials may be 0.1 or higher in mass ratio if the shielding performance exerted by the aforementioned composition (i.e., the performance obtained by the composition shown by point P1 in FIG. 3 where the density at 150° C. is approximately 1.8 g/cm³) is sufficient.

Also, it is recognized that the lower limit of the proportion of the metallic materials to be added should preferably be 0.3 in mass ratio in order to increase the content of calcium hydroxide as much as possible while maintaining approximately the same density as that of the ordinary concrete after hardening through hydration reaction. In this case, the maximum content of calcium hydroxide is 0.7 in mass ratio. Significantly high shielding performance against primary and secondary gamma rays, in particular, is achieved if the proportion of the metallic materials to be added is increased in the aforementioned fashion.

The foregoing discussion can be summarized by saying that the content of the metallic materials should preferably 10% to 70% by mass, and more preferably 30% to 70% by mass, and according to the invention, it is possible to manufacture concrete having excellent shielding performance against gamma rays, so that the thickness of a shielding structure can be reduced compared to prior art structures.

Experiment 5

Next, Experiment 5 was conducted on the performance of concrete.

Figure 5:
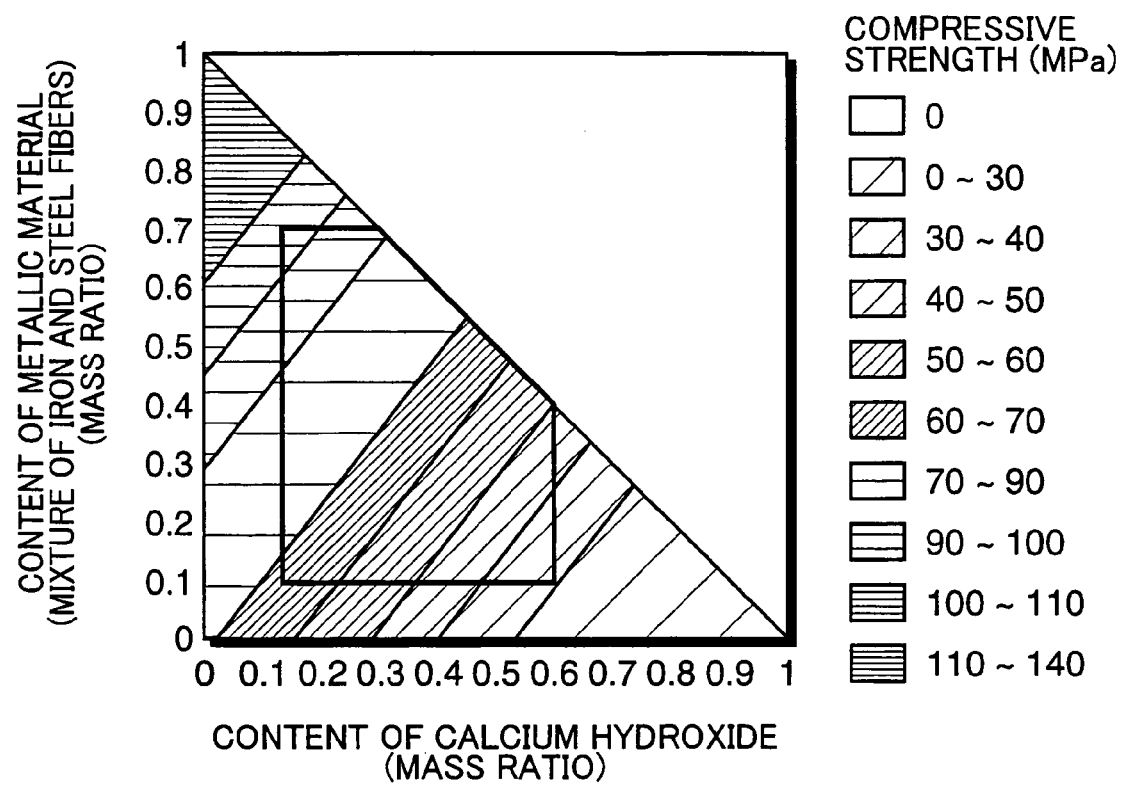
FIG. 5 is a graph showing the relationship between the compressive strength of concrete and the content of calcium hydroxide and metallic material.

Specifically, characteristics of various samples of Portland cement concrete in which calcium hydroxide and metallic materials (a mixture of iron powder and steel fibers) were mixed at different ratios were analyzed in Experiment 5. FIG. 5 shows the relationship between the compressive strength of the concrete samples and the proportions of calcium hydroxide and the metallic materials in the concrete.

Enclosed by thick solid lines in FIG. 5 is a region in which the content of calcium hydroxide is 15% to 60% by mass and the content of the metallic materials is 10% to 70% by mass. It can be seen from FIG. 5 that composites meeting these conditions exhibit compressive strengths of 10 to 110 MPa.

Results of this Experiment indicate that a sufficient compressive strength is obtained as long as the contents of calcium hydroxide and the metallic materials fall within the aforementioned ranges.

Furthermore, addition of a neutron-absorbing material (e.g., a boron compound) produces the following effects. Generally, when neutrons are intercepted by a shielding structure, they react with elements contained in shielding materials and generate secondary gamma rays. If a neutron-absorbing material such as a boron compound is added to a composite for manufacturing the shielding structure, neutrons are absorbed and generation of secondary gamma rays is suppressed. Examples of such neutron-absorbing materials are boron carbide, boric acid, boron oxide, ferroboron, borated stainless steel containing boron and a mixture containing at least one of these materials.

Figure 7:
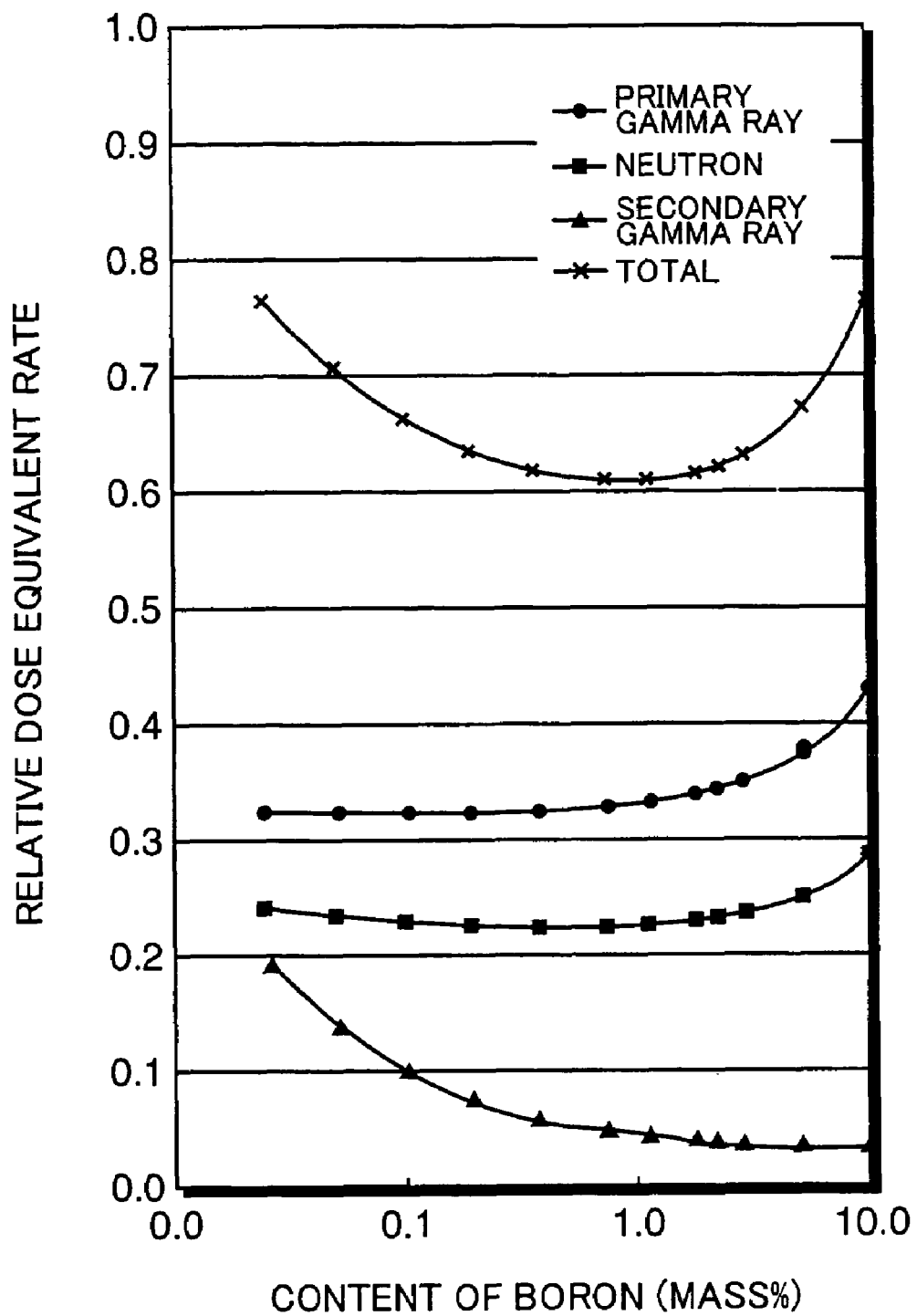
FIG. 7 is a graph showing the relationship between the amount of boron expressed in terms of its ratio to the total amount of materials and the relative dose equivalent rate.

FIG. 6 is a table showing results of calculation of the amount of boron expressed in terms of its ratio to the total amount of materials and the dose equivalent rate relative to a case where boron is not added, and FIG. 7 is a graph showing the relationship between the amount of boron expressed in terms of its ratio to the total amount of materials and the relative dose equivalent rate. It is recognized from these calculation results that the amount of secondary gamma rays can be reduced by half or more if boron is added at 0.025% by mass.

It can be seen from FIGS. 6 and 7 that the total dose equivalent rate gradually decreases at first with an increase in the amount of boron added mainly due to its effect of reducing secondary gamma rays. While the total dose equivalent rate reaches a minimum level at about 1.0% by mass of boron added, the total dose equivalent rate increases with a further increase in the amount of boron added. This is because while the effect of reducing secondary gamma rays exerted by boron levels off at a particular point, an increase in the amount of boron added beyond this point results in a relative reduction in the amount of elements which contribute to shielding primary gamma rays and neutrons. Since the content of the elements exhibiting ordinary shielding effects relatively decreases with an increase in the amount of boron added, the content of boron in the shielding structure should be made as small as possible within a range in which positive effects are obtained by the addition of boron. Careful examination of the calculation results shown in FIGS. 6 and 7 indicates that the content of the neutron-absorbing material, such as boron, should held within its optimum range, that is, preferably 0.025% to 10.0% by mass.

If borated stainless steel is used as a metallic additive to the concrete, it is possible to obtain an effect of reducing secondary gamma rays without causing deterioration of the shielding performance of the concrete against primary gamma rays and neutrons.

Referring now to specific examples, concrete casks manufactured by using the aforementioned composites and concretes are described.

Figure 8A:
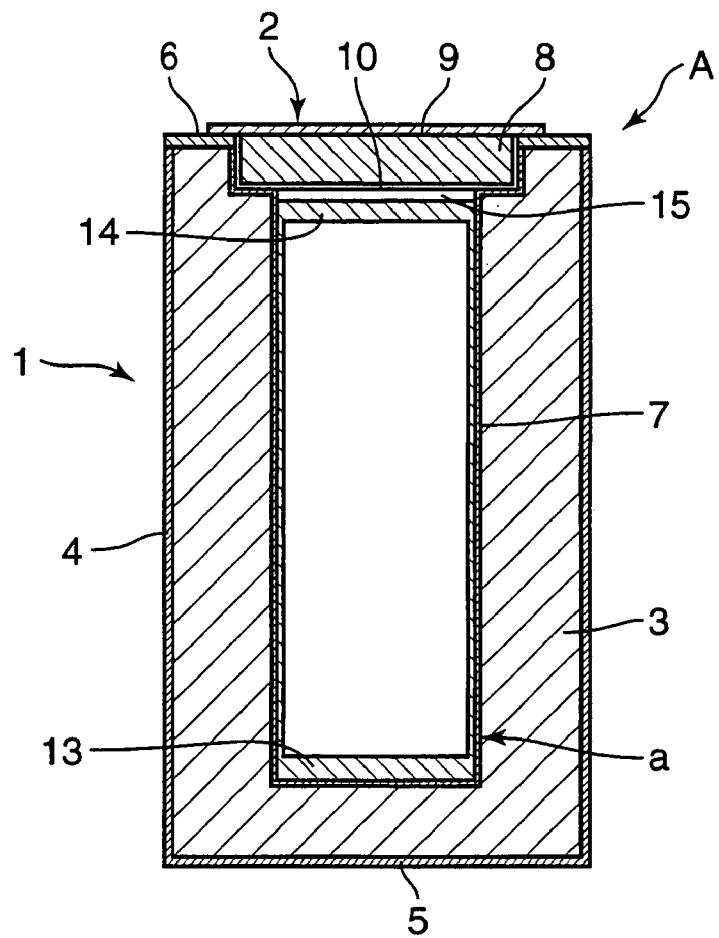
FIGS. 8A-8B are vertical and horizontal cross-sectional views a concrete cask dedicated exclusively to storage employing a canister which serves as a sealed vessel.
Figure 8B:
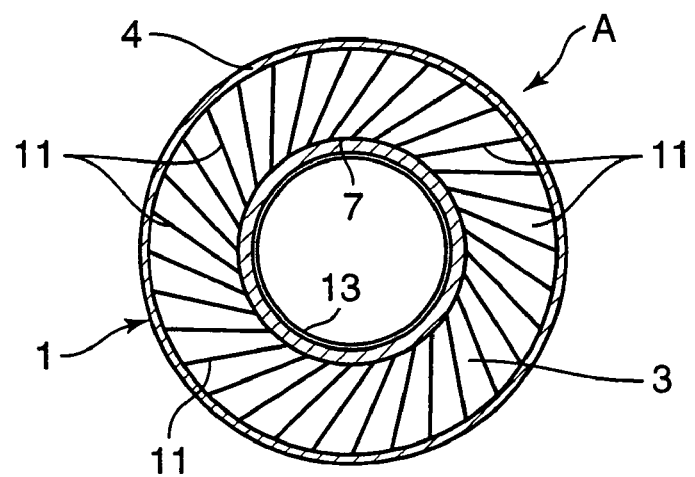
Figure 9:
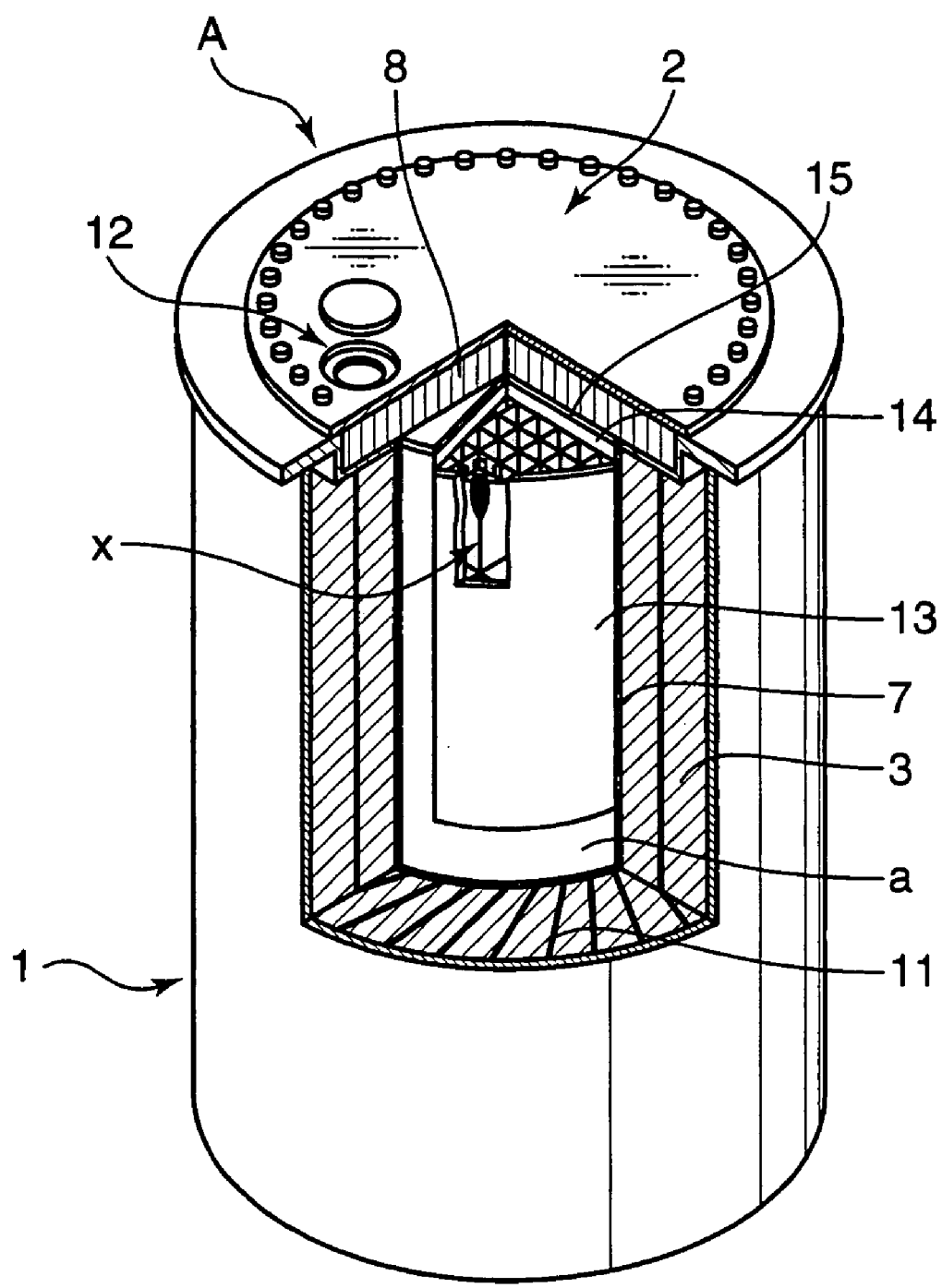
FIG. 9 is a partially cutaway perspective view showing how a radioactive material is stored in the concrete cask of FIGS. 8A-8B.

FIGS. 8A and 8B are vertical and horizontal cross-sectional views a concrete cask A dedicated exclusively to storage employing a canister which serves as a sealed vessel, and FIG. 9 is a partially cutaway perspective view showing how a radioactive material is stored in the concrete cask of FIGS. 8A and 8B.

Figure 10A:
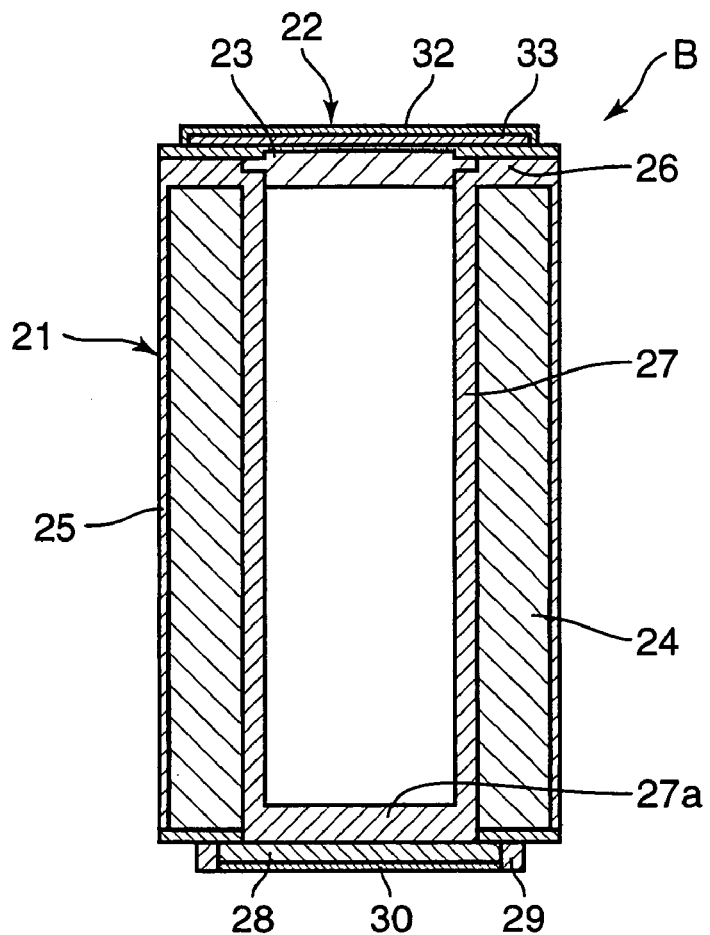
FIGS. 10A-10B are vertical and horizontal cross-sectional views a concrete cask intended for both transportation and storage.
Figure 10B:
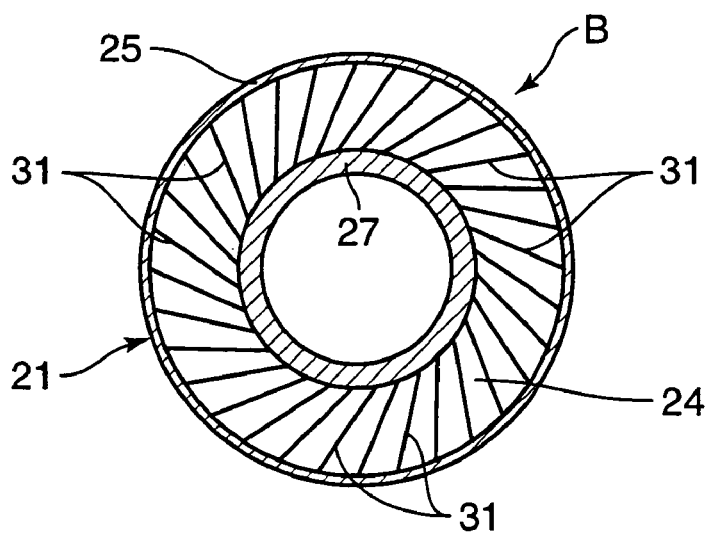
Figure 11:
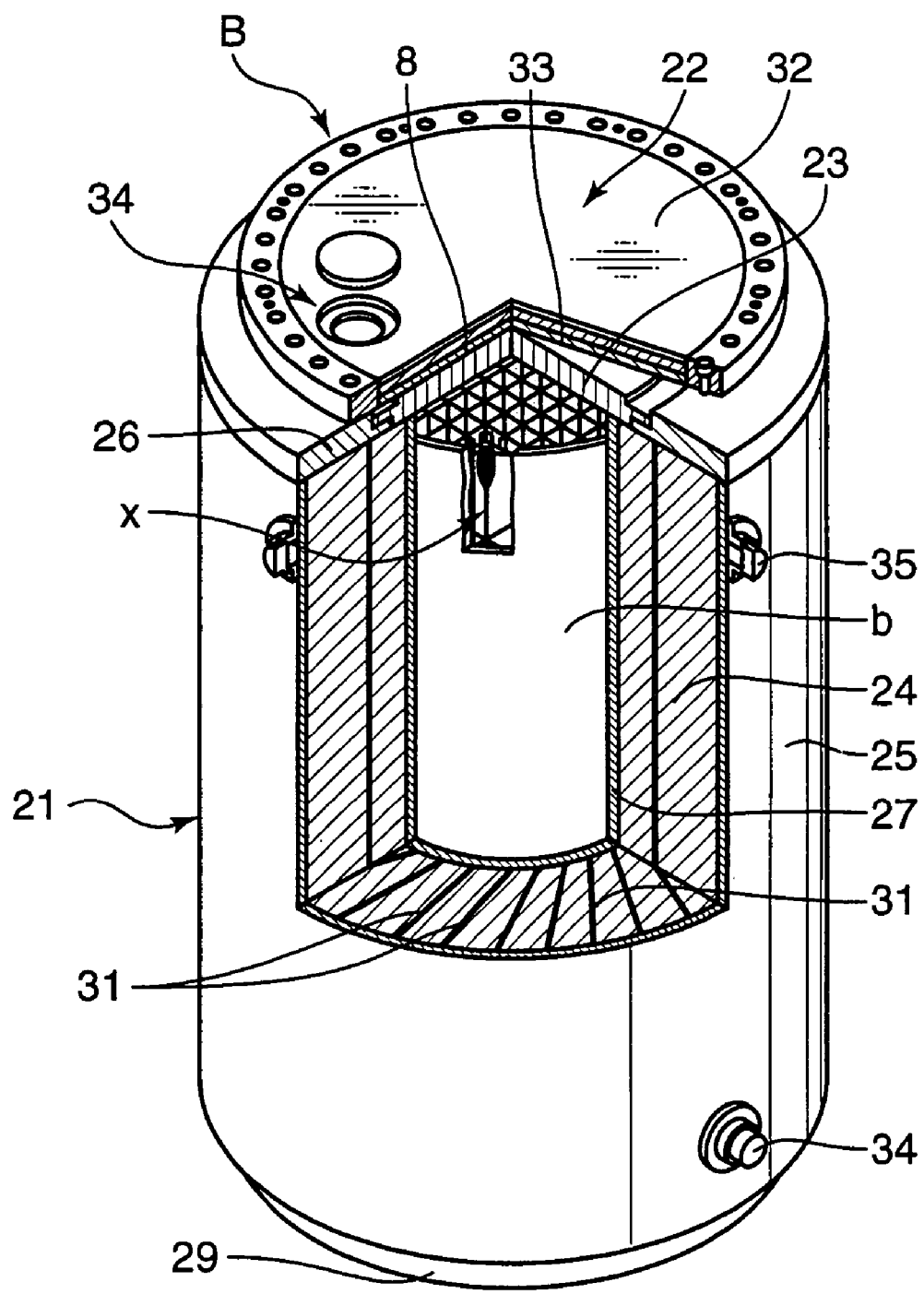
FIG. 11 is a partially cutaway perspective view showing how a radioactive material is transported or stored using the concrete cask of FIGS. 10A-10B.

FIGS. 10A and 10B are vertical and horizontal cross-sectional views a concrete cask B intended for both transportation and storage, and FIG. 11 is a partially cutaway perspective view showing how a radioactive material is transported or stored using the concrete cask of FIGS. 10A and 10B.

First Embodiment

Concrete Cask Dedicated to Storage

The concrete cask (storage cask) A shown in FIGS. 8A-8B and 9 is constructed mainly of a cylindrical container body 1 having a bottom but no lid in itself and a separate lid 2. Dedicated exclusively to storage of a radioactive material, this concrete cask A incorporates an internal canister "a".

The cylindrical container body 1 includes a concrete vessel 3 made of the aforementioned concrete of the invention manufactured by adding calcium hydroxide to cement, which is covered by an outer cylinder 4 made of carbon steel, a bottom covering 5 made of carbon steel, a thick flange 6 made of carbon steel, and an inner cylinder 7 made of carbon steel.

The lid 2 includes a lid member 8 made also of the concrete of the invention, which is covered by a thick lid top covering 9 made of carbon steel and a lid bottom covering 10 made of carbon steel. As illustrated in FIGS. 8B and 9, a number of heat-transfer fins 11 made of copper, carbon steel or aluminum alloy and arranged in a spiral stair-like form are embedded in the concrete vessel 3. The lid 2 is equipped with a seal monitoring device 12 as shown in FIG. 9.

The canister "a" is a containment vessel constructed of a receptacle 13 and a lid 14. A radioactive material x like spent nuclear fuel is filled in the canister "a" as depicted in FIG. 9.

The thickness of the outer cylinder 4 and the inner cylinder 7 are made as small as possible taking into account the need to prevent their expansion when filling cement paste as well as the need to make sure that the heat transfer fins 11 can be welded to the outer cylinder 4 and the inner cylinder 7. The thickness necessary for achieving the desired shielding performance is entirely provided by the concrete. This construction of the concrete cask A suffices the need of practical applications since a lightweight construction is not so critical for dedicated storage casks. In this concrete cask A, it is not necessary for the outer cylinder 4 or the inner cylinder 7 made of carbon steel to provide any substantial shielding effect.

The heat-transfer fins 11 may be eliminated if the amount of heat generated from the spent nuclear fuel to be stored is small.

While the concrete cask A of this embodiment has been explained as incorporating the sealed canister "a", an unsealed (open-top) basket may be used instead of the canister "a". When using the basket, the cask should be covered by a double-sealed metallic lids (primary and secondary lids) provided with an arrangement for monitoring sealing performance of the cask as is the case with a metallic cask. The concrete cask A of the embodiment employing the canister "a" is provided with the concrete lid 2 since the canister "a" does not necessarily require an arrangement for monitoring the sealing performance.

Second Embodiment

Concrete Cask for Both Transportation and Storage

The concrete cask (transportation and storage cask) B shown in FIGS. 10A-10B and 11 is constructed mainly of a cylindrical container body 21 having a bottom but no lid in itself and a separate lid 22. Intended for both transportation and storage, this concrete cask B incorporates a basket b inside.

The container body 21 includes a cylindrical vessel 24 made of shielding concrete which is covered by an outer cylinder 25 made of carbon steel, a flange 26 made of carbon steel, an inner cylinder 27 made of carbon steel, and a bottom shielding plate 27a made of carbon steel. As shown in FIG. 10A, the bottom shielding plate 28 made of a neutron-shielding material is fitted to a bottom portion 27a of the inner cylinder 27 in direct contact with its bottom surface. The bottom shielding plate 28 is covered by a ring support 29 and a bottom covering plate 30, both made of carbon steel. Designated by the numeral 35 in FIG. 11 is one of trunnions attached to the outer cylinder 25. As illustrated in FIGS. 10B and 11, a number of heat-transfer fins 31 made of copper, carbon steel or aluminum alloy and arranged in a spiral stairlike form are embedded in the cylindrical vessel 24.

The lid 22 has a double-sealed structure including a primary lid member 23 and a secondary lid member 32 as shown in FIGS. 10A and 11. The primary lid member 23 is made of Carbon steel and the secondary lid member 32 is structured by covering a lid shielding plate 33 made of a neutron-shielding material with carbon steel. The lid 22 is equipped with seal monitoring devices 34 as shown in FIG. 11. The basket b is filled with a radioactive material x like spent nuclear fuel as illustrated.

First and Second Embodiments

As it is necessary for transportation containers to meet the specific testing criteria under the accidental test conditions (e.g., drop test), the outer cylinder 25 of the concrete cask B of the second embodiment should be made more or less thicker than the outer cylinder 4 of the concrete cask A of the first embodiment. Also, there are limitations in the total weight and external dimensions of the concrete cask B for reasons of ease of handling in a nuclear reactor, so that the thickness of the inner cylinder 27 is adjusted to ensure that the concrete cask B does not violate these limitations. Generally, the inner cylinder 27 is made much thicker than the inner cylinder 7 of the concrete cask A dedicated to storage. In the second embodiment, the inner cylinder 27 is given a property to positively shield gamma rays to reduce the total weight and dimensions of the concrete cask B.

While it might be possible to employ a concrete structure for shielding neutrons penetrating the bottom portion 27a of the inner cylinder 27, it is desirable to use a high-performance neutron-shielding material other than concrete, when taking into account the limitations in weight. The concrete cask B is so structured to accommodate the basket b in the interior and the lid 22 has the double-sealed structure including the primary and secondary lid members 23, 32 as stated above. Further, there are provided the seal monitoring devices 34 to enable monitoring of the sealing performance of the cask B.

The concrete cask of the invention can only be manufactured through the development of heat-resistant concrete which can maintain a desirable water content even under high-temperature conditions. Since the concrete cask employs a completely sealed structure, it provides improved shielding performance as well as sealing performance. Even if a radioactive material accidentally leaks from the internal canister, for instance, the concrete cask performs its function as a secondary barrier having the sealing performance.

Since a sealed-type concrete cask has no vent holes, the temperature of concrete is apt to increase. Normally, the neutron-shielding performance of the ordinary concrete, when it is used for the sealed type concrete cask, deteriorates under high-temperature conditions (e.g., at around an assumed maximum temperature of 150° C.), as it is difficult to maintain the water content in concrete under such conditions. The inventors of the present Patent Application have developed concrete which can maintain a desirable water content even at a temperature of 150° C.

To achieve this, the inventors added calcium hydroxide which has a strong affinity with cement and contains water of crystallization at a high ratio, so that the water content retained in the form of crystal structure is not lost even at 100° C. In addition, the inventors did not use aggregate which does not contribute to retaining the water content.

On the other hand, adding too much calcium hydroxide results in a reduction in the density of concrete as well as in its gamma-ray shielding performance. Thus, the inventors used iron powder and steel fibers which have larger specific gravities than the aggregate. Adding these metallic materials helps improve mechanical characteristics of the concrete. This is particularly effective for transportation casks for which shock-resisting capability is critical. The inventors have succeeded in developing concrete having a specific water content and density even at 150° C. using the aforementioned approach.

As previously mentioned, calcium hydroxide itself may be added directly to a composite, or a material other than calcium hydroxide, such as calcium oxide, may be added before the composite hardens, to ensure that the concrete contains calcium hydroxide. Still alternatively, other kind of hydroxide selected from various alkaline earth metals may be added to the composite before hardening.

In the concrete cask A of the first embodiment, outer surfaces of the concrete vessel 3 are isolated from external air as they are covered by such coverings as the outer cylinder 4, the bottom covering 5, the flange 6 and the inner cylinder 7. The lid 2 of the first embodiment and the cylindrical vessel 24 of the second embodiment are also isolated in a similar fashion. Since the outer surfaces of these components are made of concrete, at least part (outer surfaces) of the concrete structures is covered by the coverings, whereby the concrete structures are isolated from the external air. This means that the concrete structures are formed in spaces shut off from carbon dioxide in the atmosphere.

If reacted with carbon dioxide present in the atmosphere, calcium hydroxide contained in the concrete structures eventually turns into calcium carbonate and its water content (hydrogen) is released from the crystalline structure. This could cause a risk of deterioration of the neutron-shielding performance of the concrete structures in the long run (refer to the chemical formula shown below).

$$Ca(OH)_2 + CO_2 \rightarrow CaCO_3 \downarrow + H_2O$$

To avoid this, it is necessary in manufacturing the concrete cask that concrete be formed in spaces sealed off by such coverings as inner and outer cylinders, a flange and a bottom covering which are made of carbon steel or stainless steel, for instance, and at least outer surfaces of the concrete be covered by the coverings.

The sealed structure of this invention for isolating concrete from the external air refers to a structure which prevents the external air including carbon dioxide from going into contact with the concrete. In this sense, the sealed structure may be provided with a relief valve for releasing gases to the exterior for the sake of safety during the useful life of the concrete cask. Furthermore, the sealed structure may be so constructed that carbon dioxide is adsorbed by an appropriate adsorbent to prevent direct contact between the concrete and carbon dioxide.

Variations of the Embodiments

Various variations of cement can be used for manufacturing the concrete casks of the invention. While widely used Portland cement is one of the best choices, blended cement is also a workable alternative. In order to lower heat of hydration, it is desirable to use low-heat Portland cement.

Portland cement may be blended with one or more silica-bearing materials, such as various kinds of slag, silica fume, fly ash, coal ash, clay, shirasu, diatomaceous earth and grain ash. Such silica-bearing materials produce a hydration reaction (pozzolanic reaction) with cement and forms a stable, insoluble compound, such as calcium silicate. Therefore, these silica-bearing materials, if added to Portland cement, serve to increase the strength of concrete over a long period of time and improve its watertightness and durability. Alternative silica-bearing materials include byproducts of stone crushing, such as sludge cake and crushed rock fine, construction wastes, such as waste earth, sludge cake obtained by treating dredged soil or construction debris, or other industrial wastes containing silica. This alternative contributes to effective use of industrial wastes.

While ingredients of blended cement are not particularly limited in this invention, it may be produced by mixing one or more of such materials as blast-furnace slag, water-granulated blast-furnace slag, air-cooled blast-furnace slag, air-cooled slag, converter slag, copper slag, ferronickel slag, silica fume, fly ash, coal ash, clay, shirasu, diatomaceous earth and grain ash with Portland cement.

The aforementioned neutron-absorbing material may be selected from such materials as boron carbide, boric acid, boron oxide, ferroboron and borated stainless steel.

Further, the material for producing the heat-transfer fins 11, 31 is not limited to copper, carbon steel or aluminum alloy but may be stainless steel, for example.

Methods of manufacturing concrete of the invention are described in the following.

The methods of manufacturing concrete of the invention are characterized in that a mixture produced by adding at least water to one of the aforementioned composites of the invention is mixed and placed in a mold and cured for at least 8 hours at a temperature of 120° C. to 240° C. and a relative humidity of 80% to 100%. More preferably, the mixture should be cured for at least 24 hours at a temperature of 60° C. to 120° C. and a relative humidity of 80% to 100%.

In addition to water, other materials may be added to the composite where necessary. For example, a chemical admixture may be added as in the aforementioned Experiments. Also, an aggregate may be added if necessary.

The mold used for making a concrete structure may be removed during its curing process or left as it is till the end of the curing process.

SPECIFIC EXAMPLES AND COMPARATIVE EXAMPLES

The methods of manufacturing concrete of the invention are now described with reference to specific examples and comparative examples thereof.

Example 1

Concrete of Example 1 was produced using a composite of which composition is given in Table 2 below. After mixing, the composite was placed in a mold. Then, at first, the composite was cured for 48 hours at 20° C. on the sealed condition, and then continuously cured for 48 hours at 90° C. and 100% RH. Upon completion of hardening, the compressive strength of the concrete and other properties (water content and density) at 150° C. were measured. Measurement results are shown in Table 3.

Comparative Examples 1 and 2

As Comparative Example 1, concrete was produced using the same composite of which composition is given in Table 2. The composite mixed and molded was sealed and cured for 28 days at 20° C. Also, as Comparative Example 2, concrete was produced using the same composite of which composition is given in Table 2 below. The composite mixed and molded was sealed and cured for 91 days at 20° C. Upon completion of hardening, the compressive strength and other properties (water content and density) of the concretes at 150° C. were measured. Measurement results are shown in Table 3.

TABLE 2

| | Quantity per unit volume (kg/m³) | | | | | | |
|---|---|---|---|---|---|---|---|
| | | | Metallic materials | | Chemical admixture | | |
| Low-heat Portland cement | Silica fume | Calcium hydroxide | Iron powder | Steel fibers | High-range water-reducing and air-entraining admixture | Antifoamer | Water |
| 907 | 129 | 672 | 513 | 185 | 91 | 16 | 256 |

TABLE 3

| | Compressive strength (MPa) | Properties at 150° C. | |
| --- | --- | --- | --- |
| | | Water content(%) | Density (g/cm³) |
| Example 1 | 109 | 12 | 2.2 |
| Comparative Example 1 | 92 | 12 | 2.2 |
| Comparative Example 2 | 112 | 12 | 2.2 |

A comparison of the measurement results on Example 1 and Comparative Examples 1 and 2 shown above indicates that the manufacturing method of the invention makes it possible in an extremely short period of time to produce concrete having as high a water content and density as the concrete made by a conventional method under high-temperature conditions of 150° C. while achieving a high compressive strength.

Example 2

Concrete of Example 2 was produced using a composite of which composition is given in Table 4 below. After mixing, the composite was placed in a mold. Upon completion of hardening, the thermal conductivity of the concrete at room temperature and other properties (water content and density) at 150° C. were measured. Measurement results are shown in Table 6.

TABLE 4

| Quantity per unit volume (kg/m³) | | | | | | | |
| --- | --- | --- | --- | --- | --- | --- | --- |
| Low-heat Portland cement | Silica fume | Calcium hydroxide | Metallic materials | | Chemical admixture | Antifoamer | Water |
| | | | Iron powder | Steel fibers | High-range water-reducing and air-entraining admixture | | |
| 287 | 32 | 1131 | 640 | 157 | 94 | 0.9 | 281 |

Example 3

Concrete of Example 3 was produced using a composite of which composition is given in Table 5 below. After mixing, the composite was placed in a mold. Upon completion of hardening, the thermal conductivity of the concrete at room temperature and other properties (water content and density) at 150° C. were measured. Measurement results are shown in Table 6.

TABLE 5

| Quantity per unit volume (kg/m³) | | | | | | | |
| --- | --- | --- | --- | --- | --- | --- | --- |
| Low-heat Portland cement | Silica fume | Calcium hydroxide | Metallic materials | | Chemical admixture | Antifoamer | Water |
| | | | Copper powder | Copper fibers | High-range water-reducing and air-entraining admixture | | |
| 287 | 32 | 1131 | 730 | 179 | 94 | 0.9 | 281 |

Comparative Example 3

Ordinary concrete was produced as Comparative Example 3. After mixing and molding, the thermal conductivity of the concrete at room temperature and other properties (water content and density) at 150° C. were measured. Measurement results are shown in Table 6.

TABLE 6

| Characteristics of Concrete Products | | | | |
| --- | --- | --- | --- | --- |
| | Properties at 150° C. | | Thermal conductivity | |
| | Water content (%) | Density (g/cm³) | at room temp. (W/m · K) | Remarks* |
| Example 2 | 12.5 | 2.2 | 2.0 | Iron content 30 mass % |
| Example 3 | 12.9 | 2.3 | 8.5 | Copper content 33 mass % |
| Comparative Example 3 | — | — | 1.2-1.5 | Ordinary concrete |

*Iron and copper were added at the same volume percentage rate.

A comparison of the measurement results on Examples 2 and 3 and Comparative Example 3 shown above indicates that the concretes of the invention have higher thermal conductivities than the ordinary concrete. It is further recognized that the thermal conductivity of the concrete can be improved by adding a material having a high thermal conductivity.

In summary, a composite of the invention includes Portland cement or blended cement including Portland cement, and at least one metallic material selected from the group consisting of iron, carbon steel and stainless steel in any of particulate, powder and fiber forms. Where the content of calcium hydroxide is in a range of 15% to 60% by mass after hardening through hydration reaction, and the content of the metallic material is in a range of 10% to 70% by mass after hardening through hydration reaction.

Alternatively, a composite including Portland cement or blended cement containing Portland cement is mixed with water in such a manner that the content of calcium hydroxide falls in a range of 20% to 50% by mass after hardening through hydration reaction.

Alternatively, the aforementioned composite further includes at least one metallic material selected from the group consisting of iron, carbon steel and stainless steel in particulate, powder or fiber form at such a proportion that the content of the metallic material falls in a range of 30% to 70% by mass after hardening through hydration reaction.

In another feature of the invention, the aforementioned composite includes the blended cement which is prepared by mixing at least one material selected from the group consisting of blast-furnace slag, water-granulated blast-furnace slag, air-cooled blast-furnace slag, air-cooled slag, converter slag, copper slag, ferronickel slag, silica fume, fly ash, coal ash, clay, shirasu, diatomaceous earth and grain ash with Portland cement.

In another feature of the invention, the aforementioned composite further includes a neutron-absorbing material which is mixed in such a manner that the content of the neutron-absorbing material falls in a range of 0.025% to 10% by mass after hardening through hydration reaction.

The aforementioned neutron-absorbing material may include at least one substance selected from the group consisting of boron carbide, boric acid, boron oxide, ferroboron and borated stainless steel.

According to the invention, concrete is manufactured by using any of the aforementioned composites including Portland cement or blended cement containing Portland cement.

According to the invention, a concrete cask includes a cask body having a bottom but no lid in itself, and a lid which can open and close off a top opening of the cask body, wherein at least one of the cask body and the lid is made of concrete manufactured by using any of the aforementioned composites.

In one feature of the invention, the cask body of the concrete cask is made of the aforementioned concrete of the invention and metallic heat-transfer fins are embedded in the container body.

According to the invention, a method of manufacturing concrete by using any of the aforementioned composites including Portland cement or blended cement containing Portland cement includes the steps of adding at least water to the composite, mixing the composite with the water and shaping a resultant mixture, and curing the mixture for at least 8 hours at a temperature of 120° C. to 240° C. and a relative humidity of 80% to 100%.

Alternatively, a method of manufacturing concrete by using any of the aforementioned composites including Portland cement or blended cement containing Portland cement includes the steps of adding at least water to the composite, mixing the composite with the water and shaping a resultant mixture, and curing the mixture for at least 24 hours at a temperature of 60° C. to 120° C. and a relative humidity of 80% to 100%.

To solve the earlier-mentioned object of the invention, a composite includes Portland cement. This composite is mixed with water in such a manner that the content of a hydroxide material retaining water in the form of a crystalline structure of which melting and decomposition temperatures exceed 100° C. is at least 15% by mass after hardening through hydration reaction.

The hydroxide material of this composite may be a hydroxide which is least soluble or insoluble in pure water, wherein the soluble amount of the hydroxide may be 15 g or less per 100 g of pure water at 20° C.

In one feature of the invention, the composite further includes at least one metallic material selected from the group consisting of iron, copper, tungsten, iron alloy, copper alloy, tungsten alloy, iron compound, copper compound and tungsten compound in particulate, powder or fiber form.

In another feature of the invention, at least one metallic material selected from the group consisting of iron, iron alloy, copper and copper alloy is mixed in the composite in such a manner that the content of the metallic material falls in a range of 10% to 70% by mass after hardening through hydration reaction.

In another feature of the invention, the metallic material is selected from the group consisting of copper, copper alloy, tungsten, tungsten alloy and tungsten compound.

In another feature of the invention, at least one metallic material selected from the group consisting of tungsten, tungsten alloy and tungsten compound is mixed in the composite in such a manner that the content of the metallic material falls in a range of 10% to 85% by mass after hardening through hydration reaction.

The aforementioned composite may further include a neutron-absorbing material selected from the group consisting of boron carbide, boric acid, boron oxide, ferroboron and borated stainless steel, wherein the neutron-absorbing material is mixed in such a manner that the content of the neutron-absorbing material falls in a range of 0.025% to 10% by mass after hardening through hydration reaction.

Also, the composite may further include a silica-bearing material.

According to the invention, concrete is manufactured by using any of the aforementioned composites including Portland cement.

According to the invention, a concrete cask is manufactured by using the aforementioned concrete in which at least part of a structure made of the concrete is covered by a covering for isolating the concrete from external air.

According to the invention, a method of manufacturing concrete by using any of the aforementioned composites including Portland cement includes the steps of adding at least water to the composite, mixing the composite with the water and shaping a resultant mixture, and curing the mixture for at least 8 hours at a temperature of 120° C. to 240° C. and a relative humidity of 80% to 100%.

Alternatively, a method of manufacturing concrete by using any of the aforementioned composites including Portland cement includes the steps of adding at least water to the composite, mixing the composite with the water and shaping a resultant mixture, and curing the mixture for at least 24 hours at a temperature of 60° C. to 120° C. and a relative humidity of 80% to 100%.

The inventors have verified from the foregoing that it is possible to manufacture a concrete cask which makes it unnecessary to provide an air passage for removing heat between the concrete cask itself and an internal basket or canister accommodating a heat-generating material, such as high-level radioactive wastes or spent nuclear fuel, by using the aforementioned composites and concrete of the invention. It is also possible to manufacture a simple, low-cost, yet highly safe concrete cask by using the heat-resistant concrete of the invention. In addition, since the concrete cask made of the heat-resistant concrete does not need any ventilation air inlet or outlet which acts as a "shielding defect," there occurs no streaming of radioactive rays or corrosion of the canister.

If metallic heat-transfer fins are embedded in a concrete container body of the concrete cask, they serve to improve the efficiency of heat transfer between inner and outer cylinders of the cask, thereby making up for a relatively low thermal conductivity of the concrete. Without such heat-transfer fins, the permissible amount of heat generation from radioactive wastes or spent nuclear fuel held in a concrete cask is limited. The provision of the heat-transfer fins makes it possible to overcome such limitations and use concrete in making a cask even when the cask is intended for accommodating spent nuclear fuel which generates a large amount of heat.

This Application is based on Japanese Patent Application Serial Nos. 2002-209842 and 2003-024209 filed with the Japanese Patent Office on Jul. 18, 2002 and Jan. 31, 2003, respectively, the contents of which are incorporated herein by reference.

Although the present invention has been fully described by way of example with reference to the accompanying drawings, it is to be understood that various changes and modifications will be apparent to those skilled in the art. Therefore, unless such changes and modifications depart from the scope of the invention hereinafter defined, they should be construed as being included therein.

What is claimed is:

1. A radiation shielding material comprising:
   Portland cement; and
   at least one metallic material selected from the group consisting of iron, carbon steel and stainless steel in any of particulate, powder and fiber forms; and wherein
   the radiation shielding material has a content of calcium hydroxide in a range of 15% to 60% by mass after hardening through hydration reaction, and the content of the at least one metallic material is in a range of 10% to 70% by mass after hardening through hydration reaction.

2. The radiation shielding material according to claim 1, wherein the content of calcium hydroxide is in a range of 20% to 50% by mass after hardening through hydration reaction.

3. The radiation shielding material according to claim 1, wherein the content of the metallic material is in a range of 30% to 70% by mass after hardening through hydration reaction.

4. The radiation shielding material according to claim 1, wherein said Portland cement is included in blended cement which is prepared by mixing at least one material selected from the group consisting of blast-furnace slag, water-granulated blast-furnace slag, air-cooled blast-furnace slag, air-cooled slag, converter slag, copper slag, ferronickel slag, silica fume, fly ash, coal ash, clay, shirasu, diatomaceous earth and grain ash with Portland cement.

5. The radiation shielding material according to claim 1, further comprising a neutron-absorbing material which is mixed in such a manner that the content of the neutron-absorbing material is in a range of 0.025% to 10% by mass after hardening through hydration reaction.

6. The radiation shielding material according to claim 5, wherein the neutron-absorbing material includes at least one substance selected from the group consisting of boron carbide, boric acid, boron oxide, ferroboron and borated stainless steel.

7. The radiation shielding material according to claim 1 further comprising at least one metallic material selected from the group consisting of iron, copper, tungsten, iron alloy, copper alloy, tungsten alloy, iron compound, copper compound and tungsten compound in any of particulate, powder and fiber forms.

8. The radiation shielding material according to claim 7, wherein at least one metallic material selected from the group consisting of iron, iron alloy, copper and copper alloy is mixed in said composite in such a manner that the content of the at least one metallic material falls in a range of 10% to 70% by mass after hardening through hydration reaction.

9. A concrete radiation shielding material comprising Portland cement, and at least one metallic material selected from the group consisting of iron, carbon steel and stainless steel in any of particulate, powder and fiber forms, and wherein the concrete radiation shielding material has a content of calcium hydroxide in a range of 15% to 60% by mass after hardening through hydration reaction, and the content of the at least one metallic material is in a range of 10% to 70% by mass after hardening through hydration reaction.

* * * * *